US012699071B2

(12) United States Patent     (10) Patent No.:   US 12,699,071 B2

Iwasawa et al.       (45) Date of Patent:     Aug. 4, 2026

(54) ELECTROLYTE ANALYSIS DEVICE AND METHOD FOR IDENTIFYING ABNORMALITY IN SAME

(71) Applicant: Hitachi High-Tech Corporation, Tokyo (JP)

(72) Inventors: Airi Iwasawa, Tokyo (JP); Emiko Ushiku, Tokyo (JP); Miki Furuya, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 246 days.

(21) Appl. No.: 18/271,506

(22) PCT Filed: Oct. 12, 2021

(86) PCT No.: PCT/JP2021/037687

§ 371 (c)(1),
(2) Date: Jul. 10, 2023

(87) PCT Pub. No.: WO2022/158057

PCT Pub. Date: Jul. 28, 2022

(65) Prior Publication Data

US 2024/0060931 A1     Feb. 22, 2024

(30) Foreign Application Priority Data

Jan. 19, 2021    (JP) ................................. 2021-006244

(51) Int. Cl.
*G01N 27/416*     (2006.01)
*G01N 27/333*     (2006.01)

(52) U.S. Cl.
CPC ....... *G01N 27/4163* (2013.01); *G01N 27/333* (2013.01)

(58) Field of Classification Search
CPC ............. G01N 27/333; G01N 27/4163; G01N 33/48707
See application file for complete search history.

(56) References Cited

U.S. PATENT DOCUMENTS

2008/0077330 A1*   3/2008   Rauh .................... G01N 27/333
                                             702/19
2012/0177536 A1    7/2012   Sakai et al.

FOREIGN PATENT DOCUMENTS

CA      2891192 A1 *   6/2014   ........... C25B 11/051
JP    2001-004586 A    1/2001
(Continued)

OTHER PUBLICATIONS

JP2016/188872, machine translation (Year: 2016).*
(Continued)

*Primary Examiner* — C. Sun

(74) *Attorney, Agent, or Firm* — Miles & Stockbridge, P.C.

(57) ABSTRACT

Provided are an electrolyte analysis device and a method for identifying an abnormality in the same that make it possible to detect an abnormality in an ion-selective electrode at an early stage. The electrolyte analysis device comprises an ion-selective electrode that generates a sample potential that is a potential corresponding to the ion concentration of a sample, a reference electrode that generates a reference potential that is a potential to serve as a reference, and a concentration calculation unit that calculates the ion concentration on the basis of the potential difference between the sample potential and the reference potential. The electrolyte analysis device is characterized by additionally comprising an abnormality determination unit for determining whether there is an abnormality on the basis of an evaluation value that has been calculated using a detergent potential (Continued)

| EVALUATION VALUE | NORMAL RANGE | ASSUMED ABNORMALITY CONTENT | SCREEN EXAMPLE AT THE TIME OF ABNORMALITY |
|---|---|---|---|
| DEVIATION RATE OF POTENTIAL OF DETERGENT | <5% | ABNORMALITY IN CARRY-OVER | SCREEN EXAMPLE 1 |
| AVERAGE VALUE OF ION CONCENTRATION OF DETERGENT | 5 TO 7 (mol/L) | ABNORMALITY IN HIGH CONCENTRATION REGION | SCREEN EXAMPLE 2 |
| AVERAGE VALUE OF ION CONCENTRATION OF STANDARD SOLUTION | 0.004 TO 0.005 (mol/L) | ABNORMALITY IN LOW CONCENTRATION REGION | SCREEN EXAMPLE 3 |
| PREDICTION VALUE OF NEXT DEVIATION RATE | <5% | CARRY-OVER ALERT | SCREEN EXAMPLE 4 | that is a potential generated by the ion-selective electrode
when a detergent was supplied.

5 Claims, 9 Drawing Sheets

(56)                      References Cited

FOREIGN PATENT DOCUMENTS

| | | | |
|---|---|---|---|
| JP | 2004-219352 | A | 8/2004 |
| JP | 2006-284282 | A | 10/2006 |
| JP | 2007-071792 | A | 3/2007 |
| JP | 2016-188872 | A | 11/2016 |
| JP | 2017-156089 | A | 9/2017 |
| JP | 2020-046403 | A | 3/2020 |
| WO | 2011034169 | A1 | 3/2011 |

OTHER PUBLICATIONS

Search Report mailed Oct. 11, 2024 in European Application No.
21921160.4.
Search Report mailed Dec. 7, 2021 in International Application No.
PCT/JP2021/037687.
Written Opinion mailed Dec. 7, 2021 in International Application
No. PCT/JP2021/037687.

* cited by examiner

[FIG. 1]
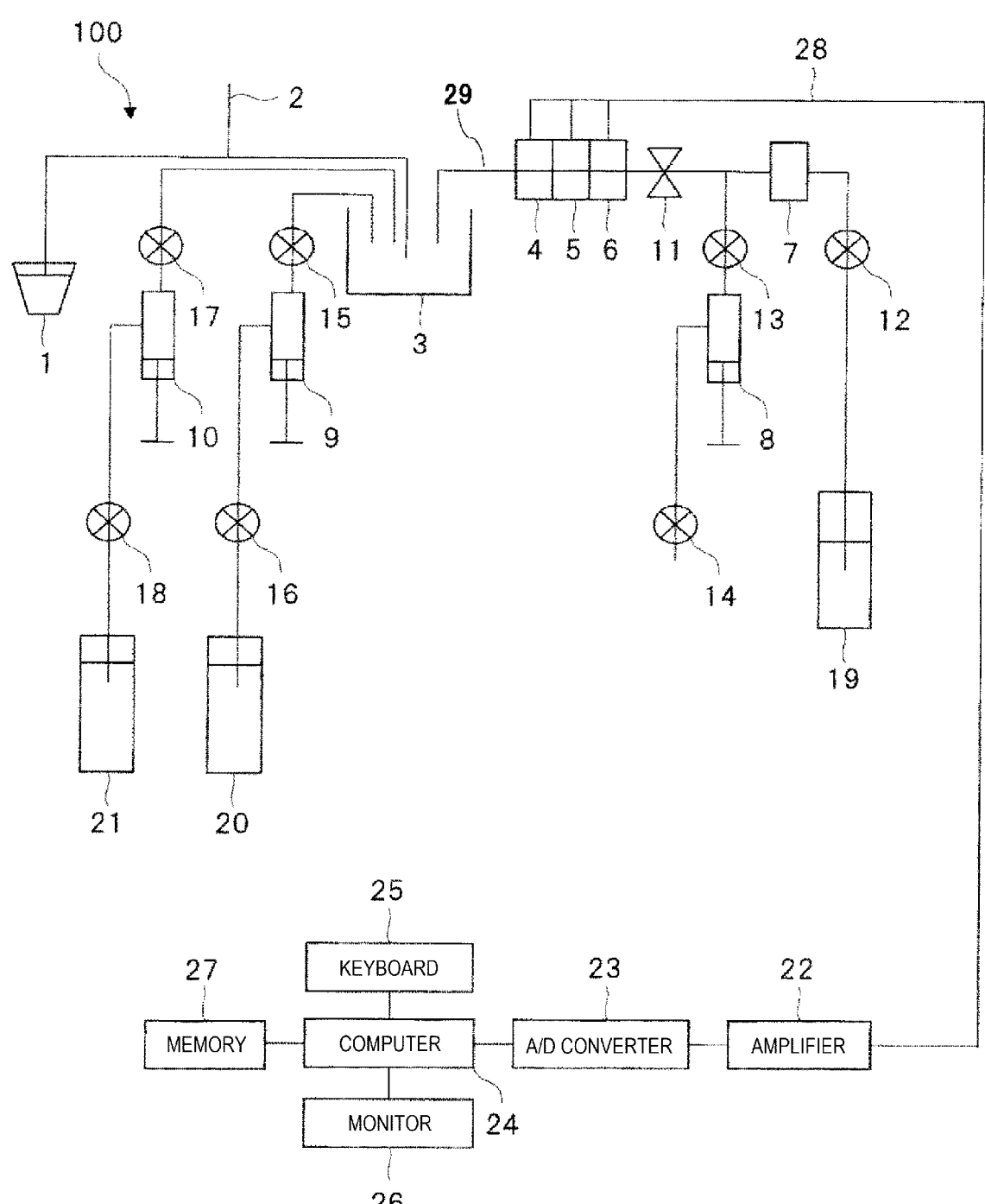

[FIG. 2]
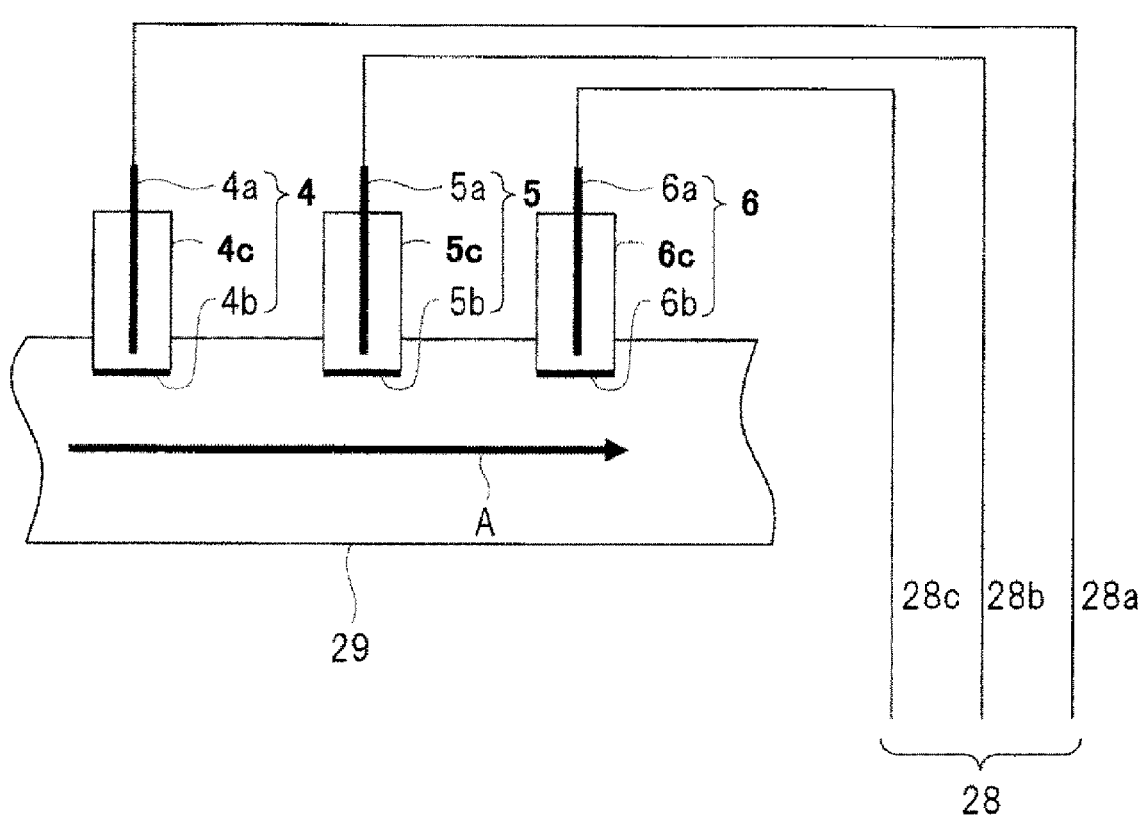

[FIG. 3]
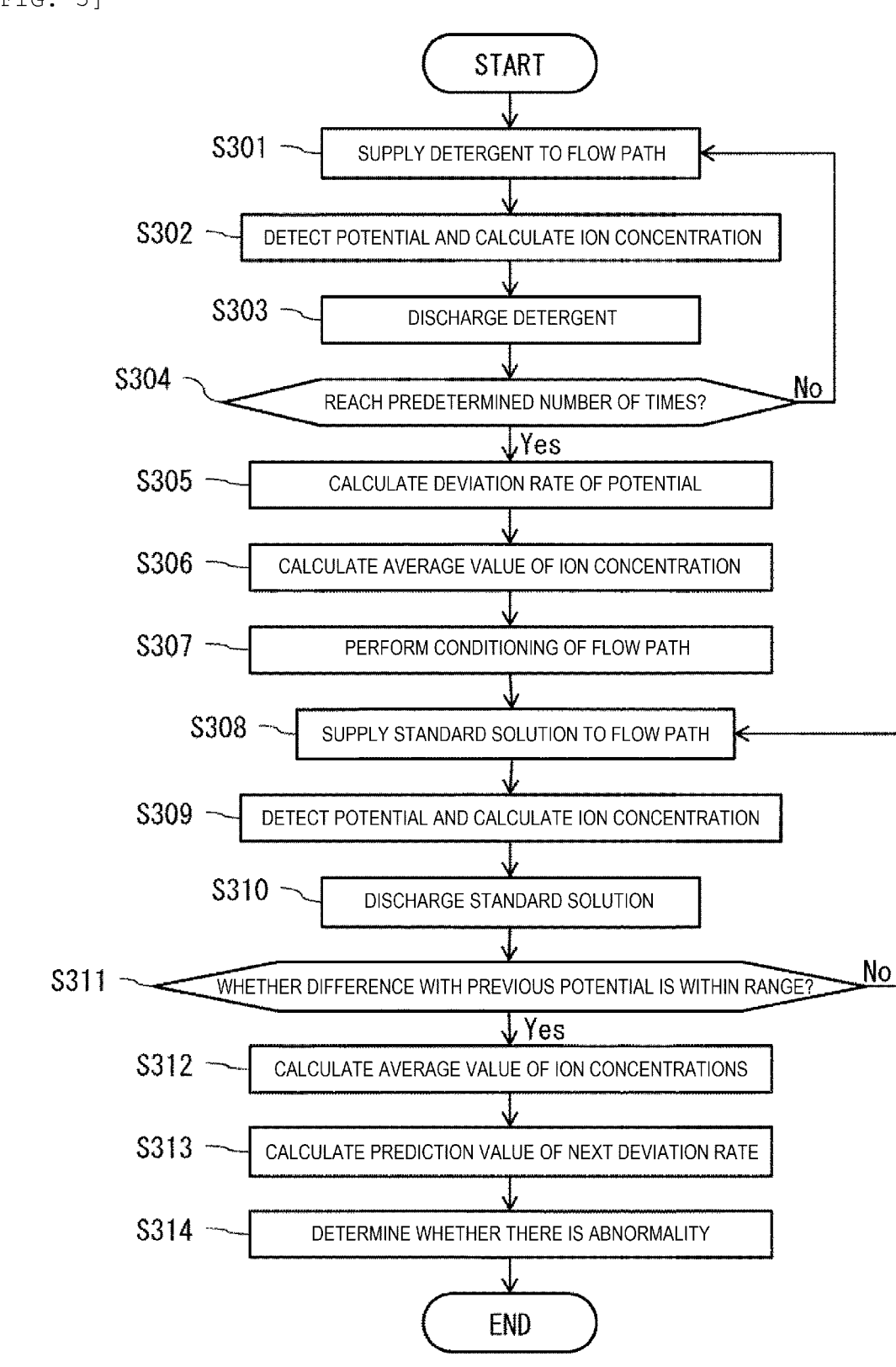

[FIG. 4]

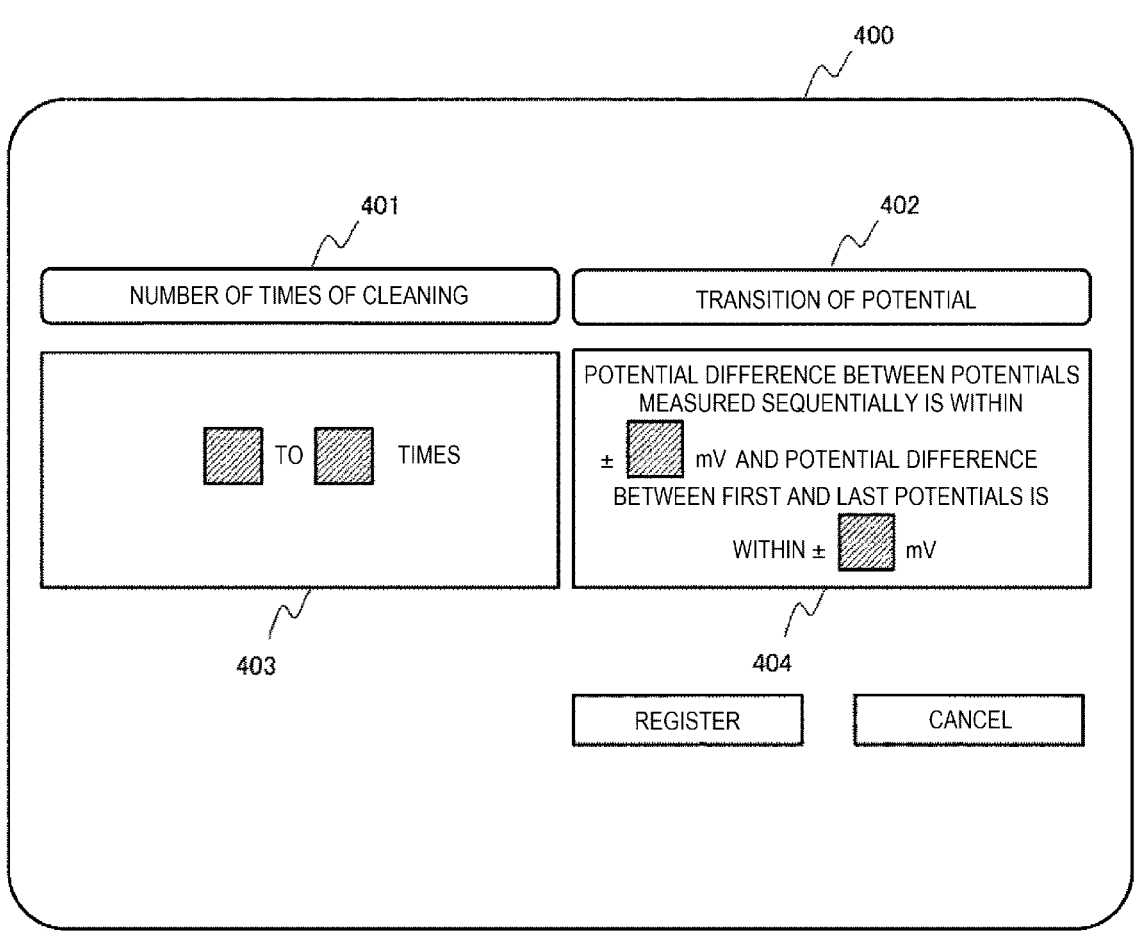

[FIG. 5]

| EVALUATION VALUE | NORMAL RANGE | ASSUMED ABNORMALITY CONTENT | SCREEN EXAMPLE AT THE TIME OF ABNORMALITY |
|---|---|---|---|
| DEVIATION RATE OF POTENTIAL OF DETERGENT | <5% | ABNORMALITY IN CARRY-OVER | SCREEN EXAMPLE 1 |
| AVERAGE VALUE OF ION CONCENTRATION OF DETERGENT | 5 TO 7 (mol/L) | ABNORMALITY IN HIGH CONCENTRATION REGION | SCREEN EXAMPLE 2 |
| AVERAGE VALUE OF ION CONCENTRATION OF STANDARD SOLUTION | 0.004 TO 0.005 (mol/L) | ABNORMALITY IN LOW CONCENTRATION REGION | SCREEN EXAMPLE 3 |
| PREDICTION VALUE OF NEXT DEVIATION RATE | <5% | CARRY-OVER ALERT | SCREEN EXAMPLE 4 |

[FIG. 6]

SCREEN EXAMPLE 1

| ALARM CODE | LEVEL | ALARM NAME | DATE AND TIME |
|---|---|---|---|
| xxx-xxxxx | ALERT | ABNORMALITY IN CARRY-OVER | xx.xx.xx/xx:xx |

DESCRIPTION AND SOLUTION

DESCRIPTION:
ABNORMALITY IN CARRY-OVER IS DETECTED.

SOLUTION:
PLEASE REPLACE ION SELECTIVE ELECTRODE OR PERFORM MAINTENANCE
(SUCH AS CLEAN VICINITY OF FLOW PATH).

Figure 7:
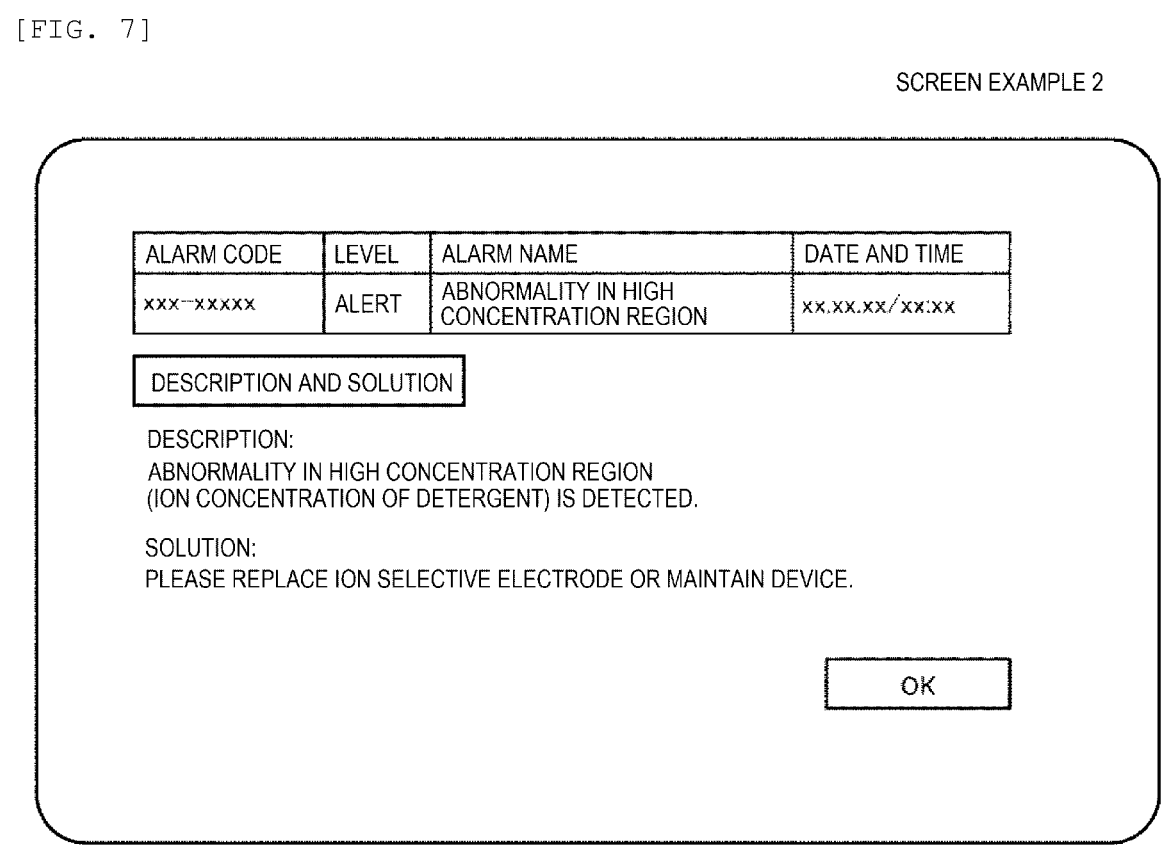

SCREEN EXAMPLE 2

| ALARM CODE | LEVEL | ALARM NAME | DATE AND TIME |
|---|---|---|---|
| xxx-xxxxx | ALERT | ABNORMALITY IN HIGH CONCENTRATION REGION | xx.xx.xx/xx:xx |

DESCRIPTION AND SOLUTION

DESCRIPTION:
ABNORMALITY IN HIGH CONCENTRATION REGION
(ION CONCENTRATION OF DETERGENT) IS DETECTED.

SOLUTION:
PLEASE REPLACE ION SELECTIVE ELECTRODE OR MAINTAIN DEVICE.

SCREEN EXAMPLE 3

| ALARM CODE | LEVEL | ALARM NAME | DATE AND TIME |
|---|---|---|---|
| xxx-xxxxx | ALERT | ABNORMALITY IN LOW CONCENTRATION REGION | xx.xx.xx/xx:xx |

DESCRIPTION AND SOLUTION

DESCRIPTION:
ABNORMALITY IN LOW CONCENTRATION REGION
(ION CONCENTRATION OF STANDARD SOLUTION) IS DETECTED.

SOLUTION:
PLEASE REPLACE ION SELECTIVE ELECTRODE OR MAINTAIN DEVICE.

SCREEN EXAMPLE 4

| ALARM CODE | LEVEL | ALARM NAME | DATE AND TIME |
|---|---|---|---|
| xxx~xxxxx | ALERT | CARRY-OVER ALERT | xx.xx.xx/xx:xx |

DESCRIPTION AND SOLUTION

DESCRIPTION:
DETECTION OF ABNORMALITY IN NEXT DEVIATION RATE
IS PREDICTED BASED ON CURRENT DEVIATION RATE (A) AND DIFFERENCE (B)
BETWEEN PREVIOUS DEVIATION RATE AND CURRENT DEVIATION RATE.

SOLUTION:
PLEASE PREPARE TO REPLACE ION
SELECTIVE ELECTRODE AND PREPARE TO MAINTAIN DEVICE.

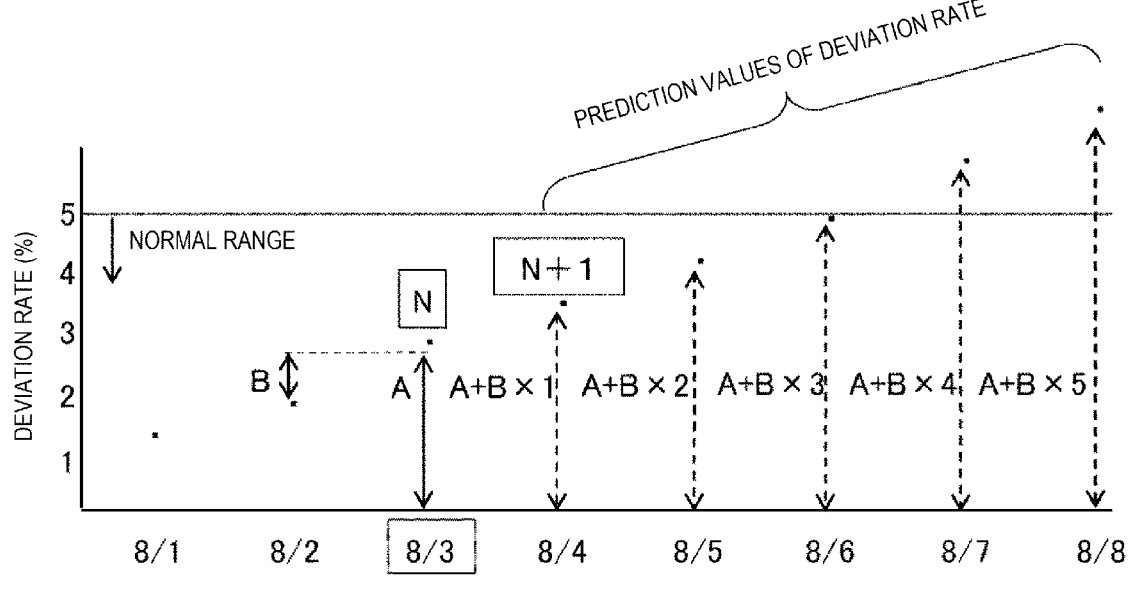

(SCHEDULED) DATE OF USE OF DEVICE

[FIG. 11]

| | ABNORMALITY IN DEVIATION RATE OF POTENTIAL OF DETERGENT | ABNORMALITY IN AVERAGE VALUE OF ION CONCENTRATION OF DETERGENT (ABNORMALITY IN HIGH CONCENTRATION REGION) | ABNORMALITY IN AVERAGE VALUE OF ION CONCENTRATION OF STANDARD SOLUTION (ABNORMALITY IN LOW CONCENTRATION REGION) | ABNORMALITY IN PREDICTION VALUE OF DEVIATION RATE | SCREEN EXAMPLE |
|---|---|---|---|---|---|
| PATTERN 1 | NO | NO | NO | YES | SCREEN EXAMPLE 4 |
| PATTERN 2 | YES | YES | YES/NO | YES | SCREEN EXAMPLE 5 |
| PATTERN 3 | YES | NO | NO | YES | SCREEN EXAMPLE 1 |
| PATTERN 4 | NO | YES | YES/NO | YES/NO | SCREEN EXAMPLE 2 |

[FIG. 12]

SCREEN EXAMPLE 5

| ALARM CODE | LEVEL | ALARM NAME | DATE AND TIME |
|---|---|---|---|
| xxx-xxxxx | ALERT | MULTIPLE ERRORS | xx.xx.xx/xx:xx |

DESCRIPTION AND SOLUTION

DESCRIPTION:
ABNORMALITY IN ION SELECTIVE ELECTRODE OR DEVICE IS DETECTED.

SOLUTION:
PLEASE REPLACE ION SELECTIVE ELECTRODE OR PERFORM MAINTENANCE
(SUCH AS CLEAN VICINITY OF FLOW PATH), AND MAINTAIN DEVICE.

OK

ELECTROLYTE ANALYSIS DEVICE AND METHOD FOR IDENTIFYING ABNORMALITY IN SAME

TECHNICAL FIELD

The present invention relates to an electrolyte analysis device for analyzing electrolyte components in a sample.

BACKGROUND ART

An electrolyte analysis device is a device that analyzes electrolyte components such as sodium (Na), potassium (K), or chlorine (Cl) in a sample, and is used in an inspection facility or the like. In many electrolyte analysis devices, a concentration of an electrolyte component in the sample is obtained by measuring a potential difference between an ion selective electrode (ISE) that generates a potential corresponding to a concentration of a specific ion and a reference electrode that generates a reference potential. These electrodes are consumable parts, and are periodically replaced because these electrodes reach the end of lifetime after a predetermined period or a predetermined number of times of use.

PTL 1 discloses that in order to manage a lifetime of an electrode, a replacement time of the electrode is calculated based on a parameter indicating a performance of the electrode and measured at the time of shutdown or startup of a device. Examples of the parameter include the potential difference between the ISE and the reference electrode, a slope that is a sensitivity to a certain ion, an accuracy that is a variation when a sample having a constant concentration is measured a plurality of times, and a certainty that is a magnitude of a deviation from an expectation value.

CITATION LIST

Patent Literature

PTL 1: JP2004-219352A

SUMMARY OF INVENTION

Technical Problem

However, in PTL 1, the parameter indicating the performance of the electrode is merely measured by using a sample or a calibration liquid serving as an electrolyte measurement target, and it is insufficient to detect an abnormality in the ion selective electrode at an early stage by using the parameter.

Therefore, an object of the invention is to provide an electrolyte analysis device and a method for identifying an abnormality in the same that can detect an abnormality in an ion selective electrode at an early stage.

Solution to Problem

In order to achieve the object described above, the invention provides an electrolyte analysis device that includes an ion selective electrode configured to generate a sample potential that is a potential corresponding to a concentration of an ion contained in a sample; a reference electrode configured to generate a reference potential that is a potential serving as a reference; and a concentration calculation unit configured to calculate the concentration of the ion based on a potential difference between the sample potential and the reference potential. The electrolyte analysis device further includes an abnormality determination unit configured to determine whether there is an abnormality based on an evaluation value calculated using a detergent potential that is a potential generated by the ion selective electrode when a detergent is supplied.

Further, the invention provides a method for identifying an abnormality in an electrolyte analysis device including an ion selective electrode configured to generate a sample potential that is a potential corresponding to a concentration of an ion contained in a sample, a reference electrode configured to generate a reference potential that is a potential serving as a reference, and a concentration calculation unit configured to calculate the concentration of the ion based on a potential difference between the sample potential and the reference potential, and the method includes a step of detecting a detergent potential that is a potential generated by the ion selective electrode when a detergent is supplied; a step of calculating an evaluation value by using the detergent potential; and a step of determining whether there is an abnormality based on the evaluation value.

Advantageous Effects of Invention

According to the invention, it is possible to provide an electrolyte analysis device that can detect an abnormality in an ion selective electrode at an early stage.

BRIEF DESCRIPTION OF DRAWINGS

FIG. 1 is a diagram illustrating an example of a configuration of an electrolyte analysis device.

FIG. 2 is a diagram illustrating an example of a configuration of an ion selective electrode.

FIG. 3 is a diagram illustrating an example of a flow of a process according to Embodiment 1.

FIG. 4 is a diagram illustrating an example of a setting screen for a condition related to a stabilized potential.

FIG. 5 is a diagram illustrating examples of an evaluation value.

FIG. 6 is a diagram illustrating a screen example 1 that is an example of a display screen when there is an abnormality in a deviation rate.

FIG. 7 is a diagram illustrating a screen example 2 that is an example of the display screen when there is an abnormality in a high concentration region.

FIG. 8 is a diagram illustrating a screen example 3 that is an example of the display screen when there is an abnormality in a low concentration region.

FIG. 9 is a diagram illustrating a screen example 4 that is an example of the display screen when there is an abnormality in a prediction value of the deviation rate.

FIG. 10 is a diagram illustrating a display example related on a transition of the prediction value of the deviation rate.

FIG. 11 is a diagram illustrating determination as to whether there is an abnormality that is based on a combination of a plurality of evaluation values.

FIG. 12 is a diagram illustrating a screen example 5 that is an example of the display screen when a plurality of evaluation values are abnormal.

DESCRIPTION OF EMBODIMENTS

Hereinafter, a preferred embodiment of an electrolyte analysis device according to the invention will be described with reference to the accompanying drawings. An electrolyte decomposition device is a device that analyzes electrolytes such as sodium ions, potassium ions, chlorine ions contained in a sample such as blood or urine supplied from a subject, and is used alone or mounted on an automatic analyzer. The automatic analyzer to which the electrolyte decomposition device is mounted includes, for example, a biochemical automatic analyzer, an immune automatic analyzer, a mass spectrometer, a coagulation analyzer, and a device obtained by combining these analyzers. In the following description and the accompanying drawings, elements that have the same function and configuration are denoted by the same reference numerals, and repeated descriptions thereof are omitted. Further, the drawings schematically represent the embodiment, and a real object may be shown in a simplified manner.

Embodiment 1

An example of a configuration of an electrolyte analysis device 100 will be described with reference to FIG. 1. The electrolyte analysis device 100 is roughly divided into a measurement unit and a control unit. The measurement unit measures a potential of a diluted sample or a standard solution that is an electrolyte solution. The control unit controls an operation of the measurement unit, and calculates a concentration of an ion contained in the electrolyte solution based on the potential measured by the measurement unit. Hereinafter, the measurement unit and the control unit will be described.

The measurement unit includes a dilution tank 3, a flow path 29, an ion selective electrode (ISE), and a reference electrode 7. The ion selective electrode includes, for example, a sodium ion selective electrode 4, a potassium ion selective electrode 5, and a chloride ion selective electrode 6.

A sample, a diluent, and a standard solution are supplied to the dilution tank 3. The sample is stored in a sample container 1 and is dispensed into the empty dilution tank 3 from the sample container 1 by a dispensing nozzle 2. The dispensed sample is diluted by further supplying the diluent to the dilution tank 3.

The diluent is stored in a diluent bottle 21, and is supplied to the dilution tank 3, in which the sample is dispensed, from the diluent bottle 21 by operations of a diluent syringe 10, a first valve for diluent 17, and a second valve for diluent 18. That is, after the diluent is aspirated into the diluent syringe 10 in a state where the first valve for diluent 17 is closed and the second valve for diluent 18 is opened, the diluent is discharged from the diluent syringe 10 to the dilution tank 3 in a state where the first valve for diluent 17 is opened and the second valve for diluent 18 is closed.

The standard solution is stored in a standard solution bottle 20, and is supplied from the standard solution bottle 20 to the empty dilution tank 3 by operations of a standard solution syringe 9, a first valve for standard solution 15, and a second valve for standard solution 16. That is, after the standard solution is aspirated into the standard solution syringe 9 in a state where the first valve for standard solution 15 is closed and the second valve for standard solution 16 is opened, the standard solution is discharged from the standard solution syringe 9 to the dilution tank 3 in a state where the first valve for standard solution 15 is opened and the second valve for standard solution 16 is closed.

The diluted sample or the standard solution, which is the electrolyte solution, is supplied to the flow path 29 together with a reference electrode liquid stored in a reference electrode liquid bottle 19 by operations of a sipper syringe 8, a pinch valve 11, a first valve 12, a second valve 13, and a third valve 14. That is, the reference electrode liquid is aspirated by the sipper syringe 8 and is supplied from the reference electrode liquid bottle 19 to the flow path 29 in a state where the first valve 12 and the second valve 13 are opened and the pinch valve 11 and the third valve 14 are closed. Thereafter, the electrolyte solution is aspirated by the sipper syringe 8 and is supplied from the dilution tank 3 to the flow path 29 in a state where the first valve 12 is switched to be closed and the pinch valve 11 is switched to be opened. The electrolyte solution and the reference electrode liquid form a liquid junction in the flow path 29. In the flow path 29, the sodium ion selective electrode 4, the potassium ion selective electrode 5, and chloride ion selective electrode 6, which constitute the ion selective electrode, are connected to an electrolyte solution side, and the reference electrode 7 is connected to a reference electrode liquid side.

Potentials corresponding to concentrations of the sodium ions, the potassium ions, and the chlorine ions contained in the electrolyte solution supplied to the flow path 29 are respectively generated by the sodium ion selective electrode 4, the potassium ion selective electrode 5 and the chloride ion selective electrode 6, and are transmitted to the control unit via a wiring 28. The sodium ion selective electrode 4, the potassium ion selective electrode 5, and the chloride ion selective electrode 6 will be described later with reference to FIG. 2. A reference potential is generated by the reference electrode 7, and is transmitted to the control unit via the wiring 28.

The control unit includes an amplifier 22, an A/D converter 23, a computer 24, a keyboard 25, a monitor 26, and a memory 27. The amplifier 22 amplifies a potential difference between the reference potential and the potential generated by each of the sodium ion selective electrode 4, the potassium ion selective electrode 5, and the chloride ion selective electrode 6, and transmits the amplified potential differences to the A/D converter 23. The A/D converter 23 converts each of the transmitted potential differences from an analog signal to a digital signal, and transmits the digital signals to the computer 24. The computer 24 uses the transmitted digital signals to calculate the concentrations of the sodium ions, the potassium ions, and the chlorine ions contained in the diluted sample. The calculated concentrations are displayed on the monitor 26.

For the calculation of the concentrations, a calibration curve stored in the memory 27 is used. The calibration curve is created in advance based on potential differences obtained by measuring, using the measurement unit, a solution in which concentrations of sodium ions, potassium ions, and chlorine ions are known. Data related to the sample, measurement conditions in the measurement unit, and the like may be input via the keyboard 25 that is an input device. Further, the diluted sample and the standard solution may be alternately supplied to the flow path 29, and the measurement of the respective potential differences may be repeated. By alternately repeating the measurement of the diluted sample and the standard solution, a measurement error can be reduced.

The sodium ion selective electrode 4, the potassium ion selective electrode 5, and the chloride ion selective electrode 6, which constitute the ion selective electrode, are described with reference to FIG. 2. The sodium ion selective electrode 4 includes an electrode 4a, a sodium ion selective membrane 4b, and a housing 4c. The housing 4c is a plastic box, the rod-shaped electrode 4a is inserted from an upper surface thereof, the sodium ion selective membrane 4b is provided therein, and the housing 4c is filled with an electrode liquid. The sodium ion selective membrane 4b is a membrane that selectively allows permeation of the sodium ions. The electrode 4a detects a potential generated in the electrode liquid by the sodium ions permeated through the sodium ion selective membrane 4b. The potential detected by the electrode 4a is transmitted via a wiring 28a. The sodium ion selective electrode 4 is connected to the flow path 29 such that the sodium ion selective membrane 4b is in contact with the electrolyte solution flowing in a direction indicated by an arrow A in the flow path 29.

The potassium ion selective electrode 5 and the chloride ion selective electrode 6 each have the same structure as the sodium ion selective electrode 4, the potassium ion selective electrode 5 includes an electrode 5a, a potassium ion selective membrane 5b, and a housing 5c, and the chloride ion selective electrode 6 includes an electrode 6a, a chlorine ion selective membrane 6b, and a housing 6c. The potassium ion selective membrane 5b is a membrane that selectively allows permeation of the potassium ions, and the chlorine ion selective membrane 6b is a membrane that selectively allows permeation of the chlorine ions. The potassium ion selective electrode 5 and the chloride ion selective electrode 6 are connected to the flow path 29 in the same manner as the sodium ion selective electrode 4.

The electrolyte solution flowing through the flow path 29 contains foreign objects such as proteins and organic substances in the sample, and airborne microorganisms from the atmosphere. When such foreign objects are attached to the sodium ion selective membrane 4b and the like, or are deposited on an inner wall of the flow path 29 or a connection portion with the flow path 29, responses and sensitivities of the sodium ion selective electrode 4, the potassium ion selective electrode 5, and the chloride ion selective electrode 6 are lowered. Therefore, in order to maintain an analytical performance of the electrolyte analysis device 100, the flow path 29, the sodium ion selective electrode 4, and the like are periodically cleaned.

However, even if the periodical cleaning is performed, it is difficult to completely remove the foreign objects adhered to the sodium ion selective membrane 4b and the like, and an abnormality occurs after a predetermined period or a predetermined number of times of use, so that replacement of the sodium ion selective electrode 4 and the like is required. Since the replacement of the sodium ion selective electrode 4 and the like requires time, labor, and materials, it is desirable to detect the abnormality at an early stage. Therefore, in Embodiment 1, since ions contained in a detergent to be used for the cleaning each are high in concentration, a state of the sodium ion selective electrode 4 and the like is determined based on an evaluation value calculated by using a potential measured at the time of the cleaning, and thus the abnormality is detected at an early stage.

An example of a flow of a process according to Embodiment 1 will be described with reference to FIG. 3 for each step.
(S301)

The computer 24 causes the dispensing nozzle 2, the sipper syringe 8, and the like to operate to supply the detergent for the cleaning to the flow path 29. Specifically, the detergent is dispensed into the dilution tank 3 by the dispensing nozzle 2 from a detergent rack in which the detergent is stored, and the detergent in the dilution tank 3 is aspirated by the sipper syringe 8 and is supplied to the flow path 29 in a state where the first valve 12 and the third valve 14 are closed, and the pinch valve 11 and the second valve 13 are opened. Further, the detergent dispensed into the dilution tank 3 may be supplied to the flow path 29 as it is, and may be supplied after being diluted using the diluent. As the detergent, a solution in which the concentrations of the sodium ions, the potassium ions, and the chlorine ions are about 1000 times those in the sample or the standard solution, for example, a solution containing sodium hypochlorite or sodium hydroxide is used.
(S302)

The computer 24 measures the potentials of the detergent in the flow path 29 by the sodium ion selective electrode 4, the potassium ion selective electrode 5, and the chloride ion selective electrode 6, and calculates the ion concentrations based on the measured potentials.
(S303)

The computer 24 causes the sipper syringe 8 and the like to operate to discharge the detergent from the flow path 29. Specifically, the detergent in the flow path 29 is aspirated by the sipper syringe 8 in the state where the first valve 12 and the third valve 14 are closed, and the pinch valve 11 and the second valve 13 are opened, and the detergent is discharged from the sipper syringe 8 in a state where the third valve 14 is switched to be opened and the second valve 13 is switched to be closed. By the supply of the detergent into the flow path 29 in S301 and the discharge of the detergent from the flow path 29 in S303, the cleaning is executed once.
(S304)

The computer 24 determines whether the aspiration and discharge of the detergent reaches a predetermined number of times. If the aspiration and discharge of the detergent reaches the predetermined number of times, the process proceeds to S305, and if the aspiration and discharge of the detergent does not reach the predetermined number of times, the process returns to S301. The number of times the flow path 29, the sodium ion selective electrode 4, the potassium ion selective electrode 5, and the chloride ion selective electrode 6 are sufficiently cleaned, for example, 15 times is set for the predetermined number of times. That is, when the predetermined number of times is set to 15 times, the cleaning and the measurement of the potentials in step S302 are executed 15 times.
(S305)

The computer 24 calculates a deviation rate VR for evaluating carry-over, by using, for example, the following equation based on the potentials measured in S302.

$$VR=(V1-Vave)/Vave \qquad \text{(Equation 1)}$$

Here, V1 represents the potential measured at the time of the first cleaning, and Vave represents an average of a stabilized potential. The stabilized potential is a potential after a value of the potential measured at the time of the cleaning reaches a certain level.

When the solution in the flow path 29 is replaced, for example, when the standard solution filling the flow path 29 before the cleaning is replaced with the detergent at the time of the cleaning, the standard solution, which is the solution to be replaced, remains in the flow path 29, and the so-called carry-over occurs. The larger a degree of deterioration of the ion selective electrode and a degree of liquid leakage from the connection portion with the flow path 29 are, the larger a residual amount of the standard solution, which is the solution to be replaced, is. In addition, each time the cleaning is repeated, the residual amount of the standard solution decreases, and then reaches a certain level.

Therefore, the carry-over is evaluated by using the V1 that is the potential measured immediately after the standard solution is replaced with the detergent, the Vave that is an average of the potential when the residual amount of the standard solution decreases to the certain level due to a plurality of times of cleaning, and the deviation rate VR calculated based on (Equation 1). That is, the larger the deviation rate VR is, the larger the degree of deterioration of the ion selective electrode is, or the larger the liquid leakage from the connection portion between the ion selective electrode and the flow path 29 is. The calculated deviation rate VR is stored in the memory 27 as one of evaluation values used to determine whether there is an abnormality.

The stabilized potential may be designated based on the number of times of the cleaning or the transition of the potential. In a case where the stabilized potential is designated based on the number of times of the cleaning, three or more potentials measured after the cleaning is executed three or more times are designated as the stabilized potentials. For example, when the predetermined number of times is 15 times, potentials measured at the time of the 13th to 15th cleaning are the stabilized potentials. In a case where the stabilized potential is designated based on the transition of the potential, continuously measured potentials, in which a difference between a potential measured at the time of the nth cleaning and a potential measured at the time of the (n+1)th cleaning is within a predetermined range, and a difference between the first potential and the last potential is within a predetermined range, are designated as the stabilized potentials. A condition related to the stabilized potential such as the selection of the number of times of the cleaning and the transition of the potential may be set by an operator.

A setting screen for the condition related to the stabilized potential will be described with reference to FIG. 4. A setting screen 400 includes a number-of-times-of-cleaning selection button 401, a potential transition selection button 402, a number-of-times setting unit 403, and a potential setting unit 404, and is displayed on the monitor 26.

The number-of-times-of-cleaning selection button 401 is clicked when the operator selects the number of times of the cleaning. When the number-of-times-of-cleaning selection button 401 is clicked, the number-of-times setting unit 403 is operable. The number of times for designating the potential as the stabilized potential is set by the number-of-times setting unit 403.

The potential transition selection button 402 is clicked when the operator selects the transition of the potential. When the potential transition selection button 402 is clicked, the potential setting unit 404 is operable. An allowable value of the difference between the potential measured at the nth cleaning and the potential measured at the (n+1)th cleaning, and an allowable value of the difference between the first and the last potentials are set by the potential setting unit 404.

The description is made referring back to FIG. 3.
(S306)

The computer 24 calculates an average value of the ion concentration of the detergent based on the average of the stabilized potential obtained in S305. The calculated average value is stored in the memory 27 as one of the evaluation values used to determine whether there is an abnormality.
(S307)

The computer 24 causes the dispensing nozzle 2, the sipper syringe 8 and the like to operate to repeatedly supply and discharge a conditioner to and from the flow path 29. The supply and discharge of the conditioner are executed in the same manner as the supply of the detergent in S301 and the discharge of the detergent in S303. The conditioner is a solution that imparts hydrophilicity to the inner wall of the flow path 29 that becomes hydrophobic due to the supply of the detergent, and a conditioner containing proteins is used.

(S308)

The computer 24 causes the standard solution syringe 9, the sipper syringe 8 and the like to operate to supply the standard solution to the flow path 29. Specifically, first, the standard solution is aspirated from the standard solution bottle 20 to the standard solution syringe 9 in a state where the first valve for standard solution 15 is closed and the second valve for standard solution 16 is opened. Then, the standard solution is discharged from the standard solution syringe 9 to the dilution tank 3 in a state where the first valve for standard solution 15 is switched to be opened and the second valve for standard solution 16 is switched to be closed. Next, the standard solution in the dilution tank 3 is aspirated by the sipper syringe 8 and is supplied to the flow path 29 in the state where the first valve 12 and the third valve 14 are closed, and the pinch valve 11 and the second valve 13 are opened.
(S309)

The computer 24 measures the potentials of the standard solution in the flow path 29 by using the sodium ion selective electrode 4, the potassium ion selective electrode 5, and the chloride ion selective electrode 6, and calculates the ion concentrations based on the measured potentials.
(S310)

The computer 24 causes the sipper syringe 8 and the like to operate to discharge the standard solution from the flow path 29. The discharge of the standard solution from the flow path 29 is executed in the same manner as the discharge of the detergent in S303. By the supply of the standard solution into the flow path 29 in S308 and the discharge of the standard solution from the flow path 29 in S310, rinsing is executed once.
(S311)

The computer 24 determines whether a previous difference, which is a difference between the potential measured in S309 and the previously measured potential, is within a predetermined range, for example, within ±0.2 mV. If the previous difference is within the predetermined range, the process proceeds to S312, and if the previous difference is not within the predetermined range, the process returns to S308. That is, if the previous difference is not within the predetermined range, it is determined that the rinsing is insufficient, and the rinsing due to the supply and discharge of the standard solution is executed again on the flow path 29.
(S312)

The computer 24 calculates an average value of the ion concentration of the standard solution based on a plurality of values of the ion concentration calculated in S309. The calculated average value is stored in the memory 27 as one of the evaluation values used to determine whether there is an abnormality.
(S313)

The computer 24 calculates a prediction value VR(N+1) of a next deviation rate based on a current deviation rate VR(N) calculated in S306 and a previously calculated deviation rate VR(N−1) by using, for example, the following equation.

$$VR(N+1)=VR(N)+\{VR(N)+VR(N-1)\} \tag{Equation 2}$$

Immediately after the ion selective electrode is replaced, N=1 and VR(0)=0. That is, a prediction value VR(2) of the next deviation rate is calculated as $2 \cdot VR(1)$.

The calculated prediction value VR(N+1) of the next deviation rate is stored in the memory 27 as one of the evaluation values used to determine whether there is an abnormality. The calculation of the prediction value of the next deviation rate is not limited to (Equation 2). For example, the prediction value VR(N+1) of the next deviation rate may be calculated by applying an extrapolation method to the current and previous deviation rates VR (1) to VR(N).

(S314)

The computer 24 determines whether there is an abnormality based on at least one of the evaluation values calculated in S305, S306, S312, and S313. When there is an abnormality, a screen for notifying the abnormality is displayed on the monitor 26.

The evaluation values will be described with reference to FIG. 5. FIG. 5 shows, as the evaluation values, the deviation rate of the potential of the detergent, the average value of the ion concentration of the detergent, the average value of the ion concentration of the standard solution, and the prediction value of the deviation rate. Further, for each evaluation value, an example of a normal range, an assumed abnormality content, and a screen example at the time of abnormality are shown.

The deviation rate of the potential of the detergent is the evaluation value calculated in S305, and is used for the evaluation of the carry-over. The normal range is set according to a rule of an inspection facility, and is set to, for example, less than 5%. When the deviation rate of the potential of the detergent deviates from the normal range, it is determined that an amount of the carry-over is large, and the deterioration of the ion selective electrode and the degree of liquid leakage from the connection portion with the flow path 29 are large, and a screen example 1 shown in FIG. 6 is displayed. In the screen example 1, "abnormality in carry-over" is shown as an alarm name. Further, a display for prompting the operator to replace the ion selective electrode or perform maintenance such as cleaning a vicinity of the flow path 29 is provided.

The average value of the ion concentration of the detergent is the evaluation value calculated in S306, and is used for the evaluation of a high concentration region. The normal range is set according to the ion concentration of the detergent, and is set to, for example, 5 to 7 (mol/L). When the average value of the ion concentration of the detergent deviates from the normal range, it is determined that there is an abnormality in the high concentration region, and a screen example 2 shown in FIG. 7 is displayed. In the screen example 2, "abnormality in high concentration region" is shown as the alarm name. Further, a display for promoting the operator to replace the ion selective electrode or maintain the device is provided. As the maintenance of the device, the operator confirms whether there is a crack, a stain, or a clogging in the flow path 29 in the vicinity of the sipper syringe 8, and when there is a crack, a stain, or a clogging, the operator repairs or replaces the flow path 29.

The average value of the ion concentration of the standard solution is the evaluation value calculated in S312, and is used for the evaluation of a low concentration region. The normal range is set according to the ion concentration of the standard solution, and is set to, for example, 0.004 to 0.005 (mol/L). When the average value of the ion concentration of the standard solution deviates from the normal range, it is determined that there is an abnormality in the low concentration region, and a screen example 3 shown in FIG. 8 is displayed. In the screen example 3, "abnormality in low concentration region" is shown as the alarm name. Further, a display for promoting the operator to replace the ion selective electrode or maintain the device is provided. Since the abnormality in the high concentration region can be detected earlier than the abnormality in the low concentration region, when an abnormality occurs in the low concentration region, an abnormality in the high concentration region also occurs.

The prediction value of the deviation rate is the evaluation value calculated in S313, and is used for the evaluation of preventive detection of the carry-over. The normal range is set according to the rule of the inspection facility, and is set to, for example, less than 5%. When the prediction value of the deviation rate deviates from the normal range, it is determined that the abnormality in the carry-over occurs at the time of the next cleaning, for example, when the electrolyte analysis device 100 is cleaned every day, the abnormality occurs at the time of the cleaning on a next day, and a screen example 4 shown in FIG. 9 is displayed. In the screen example 4, "carry-over alert" is shown as the alarm name. Further, a display for promoting the operator to prepare to replace the ion selective electrode and prepare to maintain the device is provided. As the preparation for the replacement of the ion selective electrode, the operator confirms a stock of the ion selective electrode or orders the ion selective electrode. Further, the prediction value of the deviation rate is not limited to that of the next time, and a predicted value every time after the next time may be calculated.

A display example for the transition of the prediction value of the deviation rate will be described with reference to FIG. 10. In FIG. 10, a vertical axis represents the deviation rate, a horizontal axis represents a (scheduled) date of use of the electrolyte analysis device 100, the cleaning is performed every day, 8/2 represents the previous time, 8/3 represents the current time, and 8/4 represents the next time. The prediction value of the next deviation rate is calculated as A+B×1 based on a current deviation rate A and a difference B between the previous deviation rate and the current deviation rate according to (Equation 2). In addition, the deviation rates obtained every time after the next time are calculated as A+B×2, A+B×3, A+B×4, and so on by repeatedly using (Equation 2). In FIG. 10, it is shown that among the prediction values of the deviation rate obtained at the next and subsequent times, the prediction values on 8/4 to 8/6 are within the normal range, and the prediction value on 8/7 deviates from the normal range, and thus the operator intentionally prepares to replace the ion selective electrode or the like.

The determination as to whether there is an abnormality based on a combination of a plurality of the evaluation values will be described with reference to FIG. 11. Since the abnormality in the high concentration region can be detected earlier than the abnormality in the low concentration region, combinations of the presence or absence of the abnormality in the deviation rate in S305 and the presence or absence of the abnormality in the high concentration region in S306, which are determined when the detergent high in ion concentration is supplied, will be described.

Pattern 1 is a case where there is no abnormality in the deviation rate and the high concentration region, but there is an abnormality in the prediction value of the deviation rate. In the pattern 1, the screen example 4 shown in FIG. 9 is displayed. When there is no abnormality in the prediction value of the deviation rate, the screen for notifying the abnormality is not displayed on the monitor 26. In addition, since there is no abnormality in the high concentration region, there is also no abnormality in the low concentration region.

Pattern 2 is a case where there is an abnormality in both the deviation rate and the high concentration region. In the pattern 2, a screen example 5 shown in FIG. 12 is displayed in addition to the screen example 1 in FIG. 6 that is a screen for notifying the abnormality in the deviation rate, and the screen example 2 of FIG. 7 that is a screen for notifying the abnormality in the high concentration region. In the screen example 5, "multiple errors" is shown as the alarm name. Further, a display for promoting the operator to replace or maintain the ion selective electrode and maintain the device is provided. When there is an abnormality in the high concentration region, there may be a case where there is an abnormality in the low concentration region, and a case where there is no abnormality in the low concentration region.

Pattern 3 is a case where there is an abnormality in the deviation rate, but there is no abnormality in the high concentration region. In the pattern 3, the screen example 1 shown in FIG. 6 is displayed. In addition, since there is no abnormality in the high concentration region, there is also no abnormality in the low concentration region.

Pattern 4 is a case where there is no abnormality in the deviation rate, but there is an abnormality in the high concentration region. In the pattern 4, the screen example 2 shown in FIG. 7 is displayed. When there is an abnormality in the high concentration region, there may be a case where there is an abnormality in the low concentration region, and a case where there is no abnormality in the low concentration region. When there is an abnormality in both the high concentration region and the low concentration region, the screen example 5 in FIG. 12 may be displayed.

The determination as to whether there is an abnormality based on the plurality of evaluation values is not limited to the combinations in FIG. 11. For example, an elapsed period after the replacement of the parts of the electrolyte analysis device 100 may be used as an evaluation value together with the evaluation values calculated in S305, S306, S312, and S313. Since a possibility that an abnormality occurs in a newly replaced part is low, a part whose maintenance is promoted may be selected according to a length of the elapsed period after the replacement. For example, a screen may be displayed to promote the maintenance of part in which the elapsed time after the replacement exceeds a predetermined period.

According to the flow of the process described above, the state of the ion selective electrode and the like is determined based on a measurement value when the detergent high in ion concentration is supplied to the flow path 29, so that the abnormality can be detected at an early stage. In addition, since the abnormality can be detected at an early stage, the preparation for the replacement of the ion selective electrode and the like can be performed intentionally, and waste of time, labor, and materials required for the replacement and the like can be eliminated.

The embodiment of the invention has been described above. The invention is not limited to the above embodiment, and elements may be modified without departing from the scope of the invention. A plurality of the elements disclosed in the embodiment described above can be combined as appropriate. Furthermore, some elements may be omitted from all the elements shown in the above embodiment.

REFERENCE SIGNS LIST

1: sample container
2: dispensing nozzle

3: dilution tank
4: sodium ion selective electrode
5: potassium ion selective electrode
6: chloride ion selective electrode
7: reference electrode
8: sipper syringe
9: standard solution syringe
10: diluent syringe
11: pinch valve
12: first valve
13: second valve
14: third valve
15: first valve for standard solution
16: second valve for standard solution
17: first valve for diluent
18: second valve for diluent
19: reference electrode liquid bottle
20: standard solution bottle
21: diluent bottle
22: amplifier
23: A/D converter
24: computer
25: keyboard
26: monitor
27: memory
28: wiring
29: flow path
100: electrolyte analysis device
400: setting screen
401: number-of-times-of-cleaning selection button
402: potential transition selection button
403: number-of-times setting unit
404: potential setting unit

The invention claimed is:

1. An electrolyte analysis device, comprising:

an ion selective electrode configured to generate a sample potential that is a potential corresponding to a concentration of an ion contained in a sample;

a reference electrode configured to generate a reference potential that is a potential serving as a reference; and a computer configured to calculate the concentration of the ion based on a potential difference between the sample potential and the reference potential, wherein the computer is further configured to determine whether there is a first abnormality in a high concentration region based on an evaluation value calculated using a detergent potential that is a potential generated by the ion selective electrode when a detergent is supplied;

determine whether there is a second abnormality in a low concentration region based on an evaluation value calculated using an ion concentration of a standard solution:

determine the first abnormality in the high concentration region before the second abnormality in the low concentration region; and when the first abnormality is determined to be present, determine that the second abnormality is also present, the computer uses, as the evaluation value, a deviation rate calculated based on the detergent potential measured every time supply and discharge of the detergent are repeated, the computer is further configured to calculate the deviation rate by using the detergent potential in the high concentration region measured during a first detergent supply, and an average value of the detergent potentials measured after reaching a certain level during the supply and discharge of the detergent are repeated, the computer is further configured to calculate a prediction value of the deviation rate every time after a next time, and to display a transition of the prediction value of the deviation rate, and the computer is further configured to output a carry over abnormality indication based on the calculated prediction value of the deviation rate.

2. The electrolyte analysis device according to claim 1, wherein the computer uses, as the evaluation value, a prediction value of a next deviation rate calculated based on a currently calculated deviation rate and a previously calculated deviation rate.

3. The electrolyte analysis device according to claim 1, wherein the computer uses, as the evaluation value, an ion concentration calculated based on an average value of potentials measured after the detergent potential, which is measured every time supply and discharge of the detergent are repeated, reaches a certain level.

4. The electrolyte analysis device according to claim 1, wherein a solution containing sodium hypochlorite or sodium hydroxide is used as the detergent.

5. A method for identifying an abnormality in an electrolyte analysis device, the electrolyte analysis device including an ion selective electrode configured to generate a sample potential that is a potential corresponding to a concentration of an ion contained in a sample, a reference electrode configured to generate a reference potential that is a potential serving as a reference, and a concentration calculation unit configured to calculate the concentration of the ion based on a potential difference between the sample potential and the reference potential as a high concentration region, the method comprising:

a step of detecting a detergent potential that is a potential generated by the ion selective electrode when a detergent is supplied;

a step of calculating an evaluation value by using the detergent potential;

a step of determining whether there is a first abnormality in the high concentration region based on the evaluation value using, as the evaluation value, a deviation rate calculated based on the detergent potential measured every time supply and discharge of the detergent are repeated;

a step of determining whether there is a second abnormality in a low concentration region based on an evaluation value calculated using an ion concentration of a standard solution, wherein the first abnormality in the high concentration region is determined before the second abnormality in the low concentration region;

a step of determining that the second abnormality is present when the first abnormality is determined to be present;

a step of calculating a deviation rate by using the detergent potential measured during a first detergent supply, and an average value of the detergent potentials measured after reaching a certain level during the supply and discharge of the detergent are repeated;

a step of calculating a prediction value of the deviation rate every time after a next time, and to display a transition of the prediction value of the deviation rate; and a step of outputting a carry over abnormality indication based on the calculated prediction value of the deviation rate.

\* \* \* \* \*